July 22, 1930.　　　P. V. HUNTER ET AL　　　1,771,120
FLEXIBLE ELECTRIC CONDUCTOR
Filed July 21, 1928
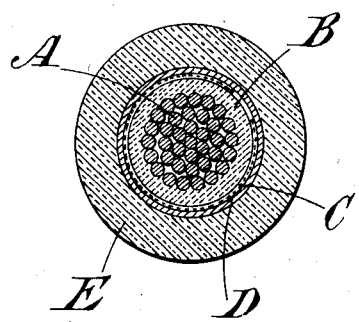
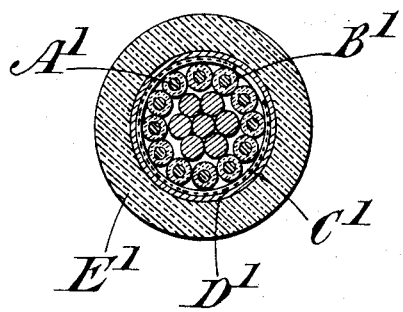

Patented July 22, 1930

1,771,120

UNITED STATES PATENT OFFICE

PHILIP VASSAR HUNTER AND HAROLD JOHN ALLCOCK, OF LONDON, ENGLAND

FLEXIBLE ELECTRIC CONDUCTOR

Application filed July 21, 1928, Serial No. 294,563, and in Great Britain August 26, 1927.

This invention relates to flexible electric conductors and has for its object to provide an insulated flexible conductor the strands of which can expand in a radial direction. Such conductors can be incorporated in a multicore cable of any known type.

According to this invention the conductor has incorporated therein during its manufacture and prior to the application of the insulating wall some substance such, for example, as resin or resin-containing material which is subsequently driven out as by heating or dissolved during the impregnation or drying process so as to leave a space, subsequently filled by impregnating compound, in which the strands of the conductor can expand in a radial direction.

In one method of manufacturing a conductor according to this invention, a layer of flexible resin or resin-containing material is extruded or otherwise deposited in the form of a tube over the strands composing the conductor. A tape of conducting material such as copper or phosphor-bronze is then wound upon the resin-coated strand to act as a support for the wall of insulation after the resin has been removed. The tape may be wound either to be overlapping or gapping and in either case, a layer of metallized paper is preferably wound over the tape before the main insulation is applied in the usual manner, the metal surface of the paper being in contact with the tape.

During the usual impregnating and drying processes after the cable has been cored up, some of the resin is melted out, the remainder being diffused in the impregnating compound which takes the place of the resin. In some cases, before the wall of insulation is applied, the strand with its lapping of tape, may be slowly passed through a heated zone so that the resin is melted out and thus removed before the insulation is applied and the cable is cored up and impregnated.

Instead of the layer of resin being applied over the finished strands, it may be interposed as a tube or layer between any two rings of wire forming the complete conductor, the outer most layer being preferably wrapped with metal tape and the resin driven out in any of the ways above described.

Alternatively a number of wires—preferably those in the outer layer—are of less than normal cross-section and are individually led through a bath of flexible resin and then passed through a die to bring them up to the normal cross-section. These resin-coated wires are then stranded up upon the remaining strands and a lapping of metal tape is applied, the resin being removed before or after the application of the insulating wall as already described, and its place taken by impregnating compound.

In all cases, after the resin has been melted out or dissolved a gap, subsequently filled with impregnating compound, is left between the strands and the helix of metal tape, permitting the strands to expand in a radial direction, the helix retaining its shape and preventing the collapse of the paper and main insulating wall even if the resin is removed before the insulation is applied.

Two forms of cable according to this invention are illustrated by way of example in the accompanying drawings, in which Figure 1 shows in cross-section an insulated cable in which a single layer or tube of resin is interposed during manufacture between the metal tape and the strands, and Figure 2 is a similar view of a modified arrangement in which the individual outer strands are each coated with resin.

In the manufacture of the cable shown in Figure 1, the strand A is passed through a known form of extruding machine containing flexible resin in a molten state containing from 10% to 20% of impregnating oil. The thickness of the resin layer B is regulated by the size of the front die and by the temperature at which the machine is maintained. Alternatively the strand may be passed through a bath of resin maintained at a predetermined temperature, surplus resin being removed by passing the strand through a heated die.

A tape C of phosphor-bronze, copper or the like is then wound upon the resin-coated strand to form a support for the insulation. The helix so formed may be gapping or overlapping but in either case a metallized paper D is preferably wound over the tape with its metal surface in contact therewith. The main insulating wall E is then applied in any known manner and the cable is then completed in the usual way, i. e. in the case of a multicore cable it is now cored up.

The cable is then dried and impregnated in the known manner and during these processes some of the resin is melted out during drying, the remainder being diffused in the impregnating compound during impregnation.

Alternatively, before the insulating paper D and main insulating wall E are applied, the strand A with its coating of resin B and lapping of metal tape C may be slowly passed through a heated zone thus melting and removing the layer of resin B before either the paper strip or insulating wall is applied.

In the modified construction shown in Figure 2, the wires $A^1$ in the outer layer are of smaller cross-section than those forming the main portion of the strand A. These wires are each run through a bath of flexible resin and then through a die and thus each is brought up to the normal cross-section with a layer of resin $B^1$. The resin-coated wires $A^1$ are then stranded up and a layer of metal tape $C^1$ is applied as before, a metal paper strip $D^1$ being interposed between the tape and the main insulating wall $E^1$. The layer of resin $B^1$ with which the outer strands are coated is removed either before or after the insulation is applied and replaced by impregnating compound as above described.

Instead of using a substance composed wholly or mainly of flexible resin, a synthetic resin or a synthetic resin-containing material may be employed.

It will be understood that the shape, thickness and composition of the resin-like substance in the conductor may vary considerably without departing from this invention, in all cases the arrangement being such that the whole or bulk of the resin-like substance originally incorporated in the conductor is subsequently removed during the completion of its manufacture and replaced by impregnating compound so as to permit the strands to expand in a radial direction without risk of the insulation collapsing.

What we claim as our invention and desire to secure by Letters Patent is:—

1. A method of making a flexible multistrand insulated electric conductor comprising introducing a resin containing substance between the conducting strands and the insulation to space the strands and insulation, and thereafter replacing the resin-containing substance by a displaceable impregnating compound so as to permit expansion of the strands in a radial direction.

2. A method of making a flexible multistrand insulated electric conductor comprising depositing a layer of resin-containing substance upon the strands during manufacture, thereafter applying the insulating covering, driving out the said substance before the manufacture of the cable is completed and replacing the same by a displaceable impregnating compound so as to enable the strands to expand in a radial direction.

3. A method of making a flexible multistrand insulated electric conductor comprising applying during manufacture a layer of flexible resin-containing substance over the strands composing the conductor, winding a metal wrapping over the resin layer and applying an insulating wall over the metal wrapping, driving out the resin-containing substance before the manufacture of the cable is completed and subsequently replacing the substance by a displaceable impregnating compound so as to enable the strands to expand in a radial direction.

4. A method of making a flexible multistrand insulated electric conductor comprising coating the individual strands forming the outermost layer with a resin-containing substance, before stranding up the same, winding a metal wrapping over the resin-coated wires and surrounding the metal wrapping with an insulating wall, driving the resin-containing substance out before the manufacture of the cable is completed and replacing the same by a displaceable impregnating compound so as to enable the strands pand in a radial direction.

5. A method of making a flexible multistrand insulated electric conductor comprising applying during manufacture a layer of flexible resin-containing substance over the strands composing the conductor, winding a metal wrapping over the resin layer, winding a wrapping of paper upon the metal wrapping and applying an insulating wall over the paper wrapping, driving out the resin-containing substance before the manufacture of the cable is completed and subsequently replacing the substance by a displaceable impregnating compound so as to enable the strands to expand in a radial direction.

6. A method of making a flexible multistrand insulated electric conductor comprising coating the individual strands forming the outermost layer and of less than normal cross-section with a resin-containing substance before stranding them up, winding a metal wrapping over the resin-coated wires and surrounding the metal wrapping with an insulating wall, driving the resin-containing substance out before the manufacture of the cable is completed and replacing the same by a displaceable impregnating compound so as to enable the strands to expand in a radial direction.

In testimony whereof we have signed our names to this specification.

PHILIP VASSAR HUNTER.
HAROLD JOHN ALLCOCK.